ID[19] United States Patent
Kaduk

[11] 3,992,645
[45] Nov. 16, 1976

[54] MAGNESIUM ALUMINATE GALLATE PHOSPHORS AND REPROGRAPHIC LAMP CONTAINING SAME

[75] Inventor: Edward E. Kaduk, Lyndhurst, Ohio

[73] Assignee: General Electric Company, Schenectady, N.Y.

[22] Filed: Mar. 22, 1976

[21] Appl. No.: 668,869

Related U.S. Application Data

[63] Continuation-in-part of Ser. No. 592,789, July 2, 1975, abandoned.

[52] U.S. Cl. ............................... 313/486; 313/488; 313/489; 252/301.4 R
[51] Int. Cl.² .................... C09K 11/30; H01J 61/35
[58] Field of Search ............. 252/301.4 R; 313/486, 313/488, 489

[56] References Cited
UNITED STATES PATENTS

| | | | |
|---|---|---|---|
| 3,458,450 | 7/1969 | Kobayashi et al. | 252/301.4 R |
| 3,503,780 | 3/1970 | Kamiya | 252/301.4 R X |
| 3,838,060 | 9/1974 | Kaduk | 252/301.4 R X |
| 3,875,455 | 4/1975 | Kaduk et al. | 313/489 |

FOREIGN PATENTS OR APPLICATIONS

| | | | |
|---|---|---|---|
| 555,305 | 4/1958 | Canada | 252/301.4 R |
| 1,302,782 | 10/1970 | Germany | 252/301.4 R |

*Primary Examiner*—Jack Cooper
*Attorney, Agent, or Firm*—John F. McDevitt; Lawrence R. Kempton; Frank L. Neuhauser

[57] ABSTRACT

Improved magnesium aluminate gallate phosphors activated by manganese are prepared containing a minor addition of stabilizer ion to avoid brightness loss when the phosphor is heated in air. The stabilizer addition also permits major substitution of aluminum for gallium along with increased manganese activator content resulting in higher powder brightness in room temperatures, greater ultraviolet absorption, and a desirable shift in spectral peak of emission response along with better resistance to oxidation when heated in air. The phosphor is particularly useful to provide improved maintenance in low-pressure mercury lamps for reprographic applications.

7 Claims, 3 Drawing Figures

PHOSPHOR BRIGHTNESS VS. MOLES ADDITIVE

MAGNESIUM ALUMINATE GALLATE PHOSPHORS AND REPROGRAPHIC LAMP CONTAINING SAME

This application is a continuation-in-part of application Ser. No. 592,789, filed July 2, 1975, now abandoned and assigned to the assignee of the present invention.

BACKGROUND OF THE INVENTION

This invention relates generally to green-emitting magnesium aluminate gallate phosphors activated by manganese and having improved characteristics attributable to minor incorporation of a particular type stabilizer additive. Specifically, the present invention represents an improvement to the same general phosphor compositions disclosed and claimed in U.S. Pat. No. 3,838,060 which is assigned to the assignee of the present invention.

Characteristics desirable in a phosphor intended for electric lamps such as fluorescent lamps are continued high brightness and resistance to oxidation at the high temperatures encountered in lamp manufacture. High temperatures are employed in lehring when the lamp envelope is heated to about 550°–600° C in air in order to decompose and drive out the binder used to apply the phosphor and also in sealing and exhaust of the lamp envelope. The phosphor should be able to withstand such heating without loss of brightness or other desirable characteristics. In the aforementioned U.S. Pat. No. 3,838,060 certain improvements were obtained in manganese-activated magnesium aluminate gallate phosphors by adding a minor proportion of stabilizer ion selected from the group consisting of an alkaline earth metal ion selected from the group of calcium, strontium and barium with phosphate ion. The molar ratios of alkaline earth metal ion to phosphate ion therein employed varied between approximately 1–1.6 and the resulting phosphor composition had the general formula:

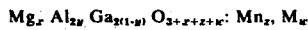

wherein $x$ is between about 0.1 and 1.2, wherein $y$ is between about 0.1 and 0.7, wherein $z$ is between about .01 and 0.1, and $w$ is between about $1 \times 10^{-5}$ and $3 \times 10^{-1}$. In the preferred embodiment, a Ca HPO$_4$ stabilizer additive at .067 molar concentration produced maximum brightness of the phosphor powder.

SUMMARY OF THE INVENTION

It has now been discovered that still further improvement in the powder brightness and resistance to oxidation from heating in air can be provided with a different type stabilizer additive and at materially reduced molar concentration levels in a magnesium aluminate gallate phosphor. More particularly, it has now been found that a stabilizer additive selected from the group consisting of boric oxide and the combination boric oxide with an alkaline earth metal ion selected from the group of calcium, strontium, and barium produces the same desirable effect upon phosphor brightness and resistance to air oxidation at lower concentrations in the phosphor as much as ten times less. It has also been found, surprisingly, that the maintenance of said phosphor compositions containing the present stabilizer additive where employed in fluorescent lamps is significantly improved.

In one of its aspects, the present phosphor composition containing a minor proportion of the above defined stabilizer additive $M_w$ can be represented by the general formula:

wherein $x$ is between about 0.1 and 1.2, wherein $y$ is between about 0.1 and 0.7, wherein $z$ is between about .01 and 0.1, and $w$ is between about $1 \times 10^{-4}$ and $3 \times 10^{-2}$. Particularly useful phosphor compositions of the present invention can contain higher proportions of the aluminum substitution for gallium wherein $y = 0.3$ and higher (0.3 atom fraction Al substituted for Ga) and further can contain at least 0.03 mole Mn$^{2+}$ per mole magnesium aluminate gallate and greater. In the preferred phosphor compositions between about 0.1 – 0.5 atom fraction of aluminum ion is substituted for gallium ion. The higher Al substitution without accompanying brightness loss is advantageous from a cost reduction standpoint, especially when considered in conjunction with lower firing temperatures which are also thereby possible.

In a preferred embodiment, an aperture-type fluorescent reprographic lamp having improved maintenance is provided employing the present phosphor composition. The phosphor coating in said improved lamps can be deposited directly on the major portion of the inner glass envelope surface or deposited upon a reflector undercoating such as is described in U.S. Pat. No. 3,875,455.

DESCRIPTION OF THE PREFERRED EMBODIMENTS

The following examples are provided to illustrate preparation of preferred phosphor compositions according to the present invention as well as the lamp test results obtained therewith:

EXAMPLE I

A phosphor composition with the basic prefired general formula Mg$_{.85}$ Al$_{0.6}$ Ga$_{1.4}$ O$_{3.88}$: .03 Mn was prepared by firing a dry blend of all starting materials. More particularly, a 79 gram batch of said phosphor composition was prepared by conventional blending of 39.45 grams Ga$_2$O$_3$, 24.24 grams MgCO$_3$ (42.5% MgO), 14.04 grams Al$_2$O$_3$ . 3H$_2$O, 1.11 grams MnCO$_3$ and further including 0.225 grams of stabilizer additive having the chemical composition CaO . 1.6 B$_2$O$_3$. The blended material was fired at approximately 1300° C in air for 4.0 hours and thereupon reblended and refired under the same firing conditions for 16.0 hours. The refired phosphor mixture was given a final firing step at 1200° C for two hours in a slightly reducing atmosphere of nitrogen containing 0.6 percent hydrogen to produce a phosphor product with the above defined chemical formula as modified by incorporation of .0045 molar concentration CaO . 1.6 $B_2O_3$. The brightness response of said phosphor composition with varying concentrations of said stabilizer additive is reported in the phosphor powder brightness measurements for these phosphor compositions along with other physical properties including a standard oxidation resistance test which consists in holding the phosphor at 550° C for 7.5 minutes in air.

Table 1

Phosphor Powder Brightness

.0225 Mole Mn/$Mg_{.85}$ Al Ga $O_{3.87}$: $M_{ir}$ (Y = 0.5)     $M_{ir}$ = Mole CB per Mole Aluminate-Gallate [CB = CaO . 1.6 $B_2O_3$]

| $M_{ir}$ | % Relative Brightness* | % U. V. Absorption | (Microns) FSS APD | Oxidation Resistance % Relative Brightness* | % U. V. Absorption | Peak Emission (Nanometers) |
|---|---|---|---|---|---|---|
| None | 66.0 | 48.4 | 1.4 | 65.6 | 48.4 | 513 |
| $4.5 \times 10^{-3}$ | 92.5 | 63.4 | 3.0 | 93.1 | 65.5 | 513–514 |
| $6.0 \times 10^{-3}$ | 98.8 | 69.0 | 4.0 | 98.8 | 68.6 | 512–513 |
| $1.0 \times 10^{-2}$ | 104.6 | 73.7 | 4.6 | 104.7 | 73.7 | 514 |
| $1.5 \times 10^{-2}$ | 107.5 | 77.4 | 6.3 | 106.6 | 77.4 | 514 |
| $3.0 \times 10^{-2}$ | 95.8 | 81.5 | 7.3 | 94.6 | 79.8 | 513 |

Figure 1:
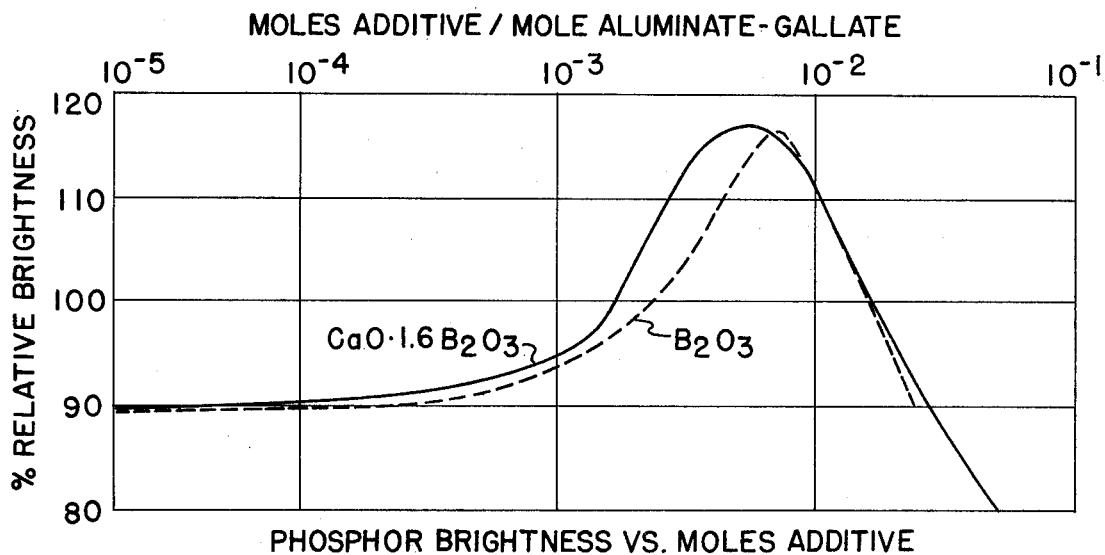
FIG. 1 is a graph illustrating variation in powder brightness with additive concentration according to the present invention.

*Compared with brightness of a standard $Mg_{.87}Ga_{1.8}Al_{0.2}O_{3.88}$: .01 Mn phosphor FIG. 1. From said graph it can be seen that the powder brightness is 90 percent or greater when compared with a standard phosphor composition having the formula:

$Mg_{0.87}$ $Ga_{1.8}$ $Al_{0.2}$ $O_{3.88}$: .01 Mn when the molar concentration of said additive per mole magnesium aluminum gallate phosphor lies in the range $1 \times 10^{-4}$ to $3 \times 10^{-2}$. Accompanying brightness measurements are also shown in FIG. 1 for incorporation of $B_2O_3$ stabilizer additive in the same phosphor composition prepared under the same firing conditions. The source material for said additive was $NH_4$ $HB_4$ $O_7$ . $3H_2O$. All brightness measurements reported in FIG. 1 and elsewhere in the present specification were obtained in a conventional manner employing eye-sensitivity filtering means with a photocell detector.

Figure 2:
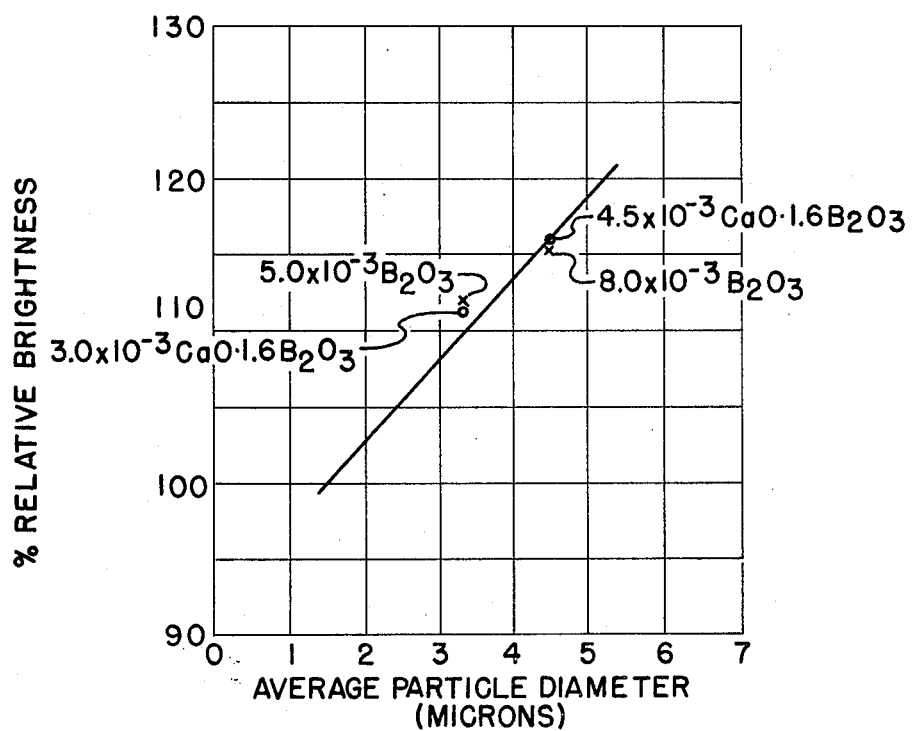
FIG. 2 is a graph illustrating variation in powder brightness with average particle size of the phosphor composition containing the present additives.

In FIG. 2 there is a comparison in powder brightness between the phosphor compositions containing $B_2O_3$ or CaO . 1.6 $B_2O_3$ as compared with the preferred stabilizer embodiment employed in the previously referenced U.S. Pat. No. 3,838,060 patent. The diagonal line appearing in said graph represents the variation in powder brightness with phosphor particle size (as measured by the recognized Fisher Sub-Sieve Sizer method) for the same general phosphor composition containing .067 molar concentration $CaHPO_4$ as the stabilizer additive. Specific points on said graph represent the present stabilizer modification having the particular concentrations shown. It can be seen from said comparison that at the same phosphor particle size there is achieved the same brightness with a much lower molar concentration of the present additives.

EXAMPLE II

A phosphor composition having the basic general formula $Mg_{.85}$ Al $GaO_{3.87}$: 0.225 Mn was prepared having various molar concentrations of CaO . 1.6 $B_2O_3$ stabilizer additive by the same method and firing conditions employed in the preceding example. As an example, a 77 gram batch of said phosphor composition containing 0.006 molar concentration of the CaO . 1.6 $B_2O_3$ stabilizer additive was prepared from a starting admixture consisting of 28.2 grams $Ga_2O_3$, 24.2 grams $MgCO_3$ (42.5% MgO), 23.4 grams $Al_2$ $O_3$ . $3H_2O$, 0.835 grams Mn $CO_3$ and 0.30 grams of the specified stabilizer additive. In the following Table 1, there is shown As can be seen from the preceding table, phosphor brightness at room temperature increases with increasing additive concentration up to a maximum at $1.5 \times 10^{-2}$ molar concentration which may be attributable to the corresponding increase in the ultraviolet absorption. Part of the increase in brightness may also be due to the shift in emission peak wave length as listed in said table with the light being greener at higher molar concentrations of the present stabilizer additives.

Test reprographic lamps were constructed to permit a further comparison between various stabilized phosphor compositions. The basic phosphor composition prepared in Example I was employed and modified with either $4.5 \times 10^{-3}$ molar concentration CaO . 1.6 $B_2O_3$ or $5 \times 10^{-3}$ molar concentration $B_2O_3$ and compared with .067 molar concentration Ca $HPO_4$. The lamp test results are reported in Table 2 below:

Table 2

T-8, 18″ Aperture Lamp Data - MG/B Phosphor Calcium Borate Additive

.03 Mole Mn/$Mg_{.85}Al_{.6}Ga_{1.4}O_{3.88}$: $M_{ir}$
($M_{ir}$ = Mole stabilizer additive per mole aluminate gallate)

| | Lamp Lumen Output (Hrs.) | | | | 500/0.5 Hr. |
|---|---|---|---|---|---|
| $M_{ir}$ | 0.5 | 100 | 300 | 500 | % Maintenance |
| .067 $CaH_{.004}$ | 538 | 457 | 423 | 408 | 76.0 |
| $4.5 \times 10^{-3}$ CaO . 1.6 $B_2O_3$ | 556 | 516 | 471 | 457 | 82.3 |
| $5 \times 10^{-3}$ $B_2O_3$ | 553 | 509 | 473 | 474 | 85.8 |

As can be noted from the above lamp test results, the stabilizer additives of the present invention provide superior maintenance as well as brightness at lower concentrations.

Figure 3:
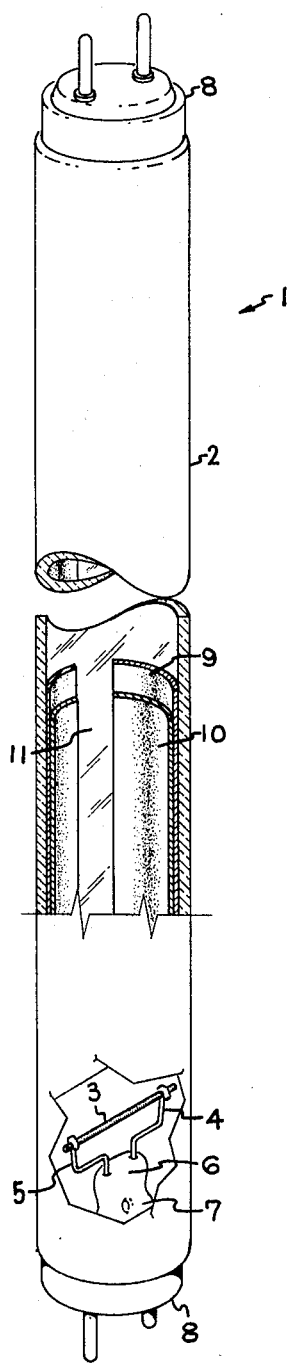
FIG. 3 is a perspective view of a preferred reprographic-type lamp construction according to the invention.

A preferred aperture-type fluorescent reprographic lamp utilizing the present improved phosphor compositions is shown in FIG. 3. Referring to said drawing, there is shown a fluorescent lamp 1 comprising an elongated soda-lime silica glass bulb 2 of circular cross section. It has the usual electrode structure 3 at each end supported on in-lead wires 4, 5 which extend through a glass press seal 6 in a mount stem 7 to the contacts of a base 8 affixed to the end of the lamp. The sealed tube is filled with an inert gas such as argon and a mixture of argon and other gases at a low pressure, for example about 3 torr, and a small quantity of mercury, at least enough to provide a low vapor pressure of about six microns during lamp operation. The inner surface of the glass bulb is provided with a reflector undercoating 9 and a phosphor coating 10 which has been deposited on said underlayer. Both of said coatings extend substantially the full length of the bulb and around the major portion of the bulb's circumferential surface except for a narrow transparent strip or aperture 11 extending lengthwise in said lamp. Said reflector underlayer and further details of the preferred lamp construction are more particularly described in the previously referenced U.S. Pat. No. 3,875,455.

To more particularly define the improved magnesium aluminate gallate phosphor compositions of the present invention which further contain the stabilizer additive incorporated as a constituent therein by introducing said additive in the starting materials employed for phosphor preparation, certain further examples are given. As previously indicated, the stabilizer additive material itself is selected from the group consisting of boric oxide and the combination of boric oxide with an alkaline earth metal ion selected from the group of calcium, strontium and barium. A more particularly defined characterization for the combined boric oxide and alkaline earth metal ion form of said additive comprises a molar ratio of boric oxide to a molar ratio of alkaline earth metal oxide in the approximate range from 1:1 to 16:1, respectively. In Table 3 below, there is shown comparable phosphor brightness measurements upon the present phosphor compositions wherein the stabilizer additive material employs equimolar proportions of $B_2O_3$ and either BaO or SrO as the source of alkaline earth metal ion in said additive.

phosphor composition to avoid brightness loss when the phosphor is heated in air, said stabilizer additive being selected from the group consisting of boric oxide and the combination of boric oxide with an alkaline earth metal oxide selected from the group of calcium, strontium and barium oxides having the general formula:

$$Mg_x Al_{2y} Ga_{2(1-y)} O_{3+x+z+w}: Mn_z, M_w$$

wherein $x$ is between about 0.1 and 1.2, wherein $y$ is between about 0.1 and 0.7, wherein $z$ is between about .01 and 0.1, and $w$ is between about $1 \times 10^{-4}$ and $3 \times 10^{-2}$ and wherein the molar ratio of boric oxide to alkaline earth metal oxide is in the approximate range of from 1:1 to 1.6:1.

2. A phosphor as in claim 1 wherein the stabilizer additive is a combination of calcium oxide and boric oxide.

3. A phosphor as in claim 1 wherein $y$ is between about 0.1 – 0.5.

4. An improved aperture-type fluorescent reprographic lamp comprising an elongated envelope containing an ionizable medium including mercury vapor and having electrodes at the respective ends thereof and a phosphor coating deposited on the major portion of the inner envelope surface so as to provide an uncoated longitudinal aperture, the improvement which comprises utilizing a magnesium aluminate gallate phosphor composition activated with manganese which further contains a minor proportion of stabilizer additive incorporated as a constituent therein by including same in the starting materials for preparation of the phosphor composition to avoid brightness loss when Table 3

.03 Mn/Mg$_{.85}$Al$_{0.6}$Ga$_{1.4}$O$_{3.88}$: M$_w$ (y = 0.3)
(M$_w$ = Mole additive per mole aluminate gallate

| Additive | M$_w$ | % Relative Brightness* | % U.V. Absorption | FSS APD (Mic.) | Oxidation Resistance | |
|---|---|---|---|---|---|---|
| | | | | | % Relative Brightness* | % U.V. Absorption |
| SrO . B$_2$O$_3$ | .005 | 112.8 | 90.3 | 4.5 | 111.6 | 90.3 |
| BaO . B$_2$O$_3$ | .005 | 113 | 88.7 | 3.5 | 109.5 | 89.0 |

*Compared with brightness of standard Mg$_{.87}$Al$_{0.2}$Ga$_{1.8}$O$_{3.88}$: .01Mn phosphor The above brightness tests demonstrate that an equivalent improvement is obtained with BaO or SrO incorporation in the additive material as compared with the CaO containing additives previously illustrated.

It will be apparent from the foregoing description that generally useful phosphor compositions have been provided for mercury vapor lamps which have proven particularly useful in reprographic applications. It will be apparent, however, that modifications can be made in the present improved phosphor compositions above specifically disclosed without departing from the true spirit and scope of this invention. Consequently, it is intended to limit the present invention only by the scope of the appended claims.

What I claim as new and desire to secure by Letters Patent of the United States is:

1. An improved magnesium aluminate gallate phosphor composition activated with manganese which further contains a minor proportion of stabilizer additive M$_w$ incorporated as a constituent therein by including same in the starting materials for preparation of the the phosphor is heated in air, said stabilizer additive being selected from the group consisting of boric oxide and the combination of boric oxide with an alkaline earth metal oxide selected from the group of calcium, strontium and barium oxides having the general formula:

$$Mg_x Al_{2y} Ga_{2(1-y)} O_{3+x+z+w}: Mn_z, M_w$$

wherein $x$ is between about 0.1 and 1.2, wherein $y$ is between about 0.1 and 0.7, wherein $z$ is between about .01 and 0.1, and $w$ is between about $1 \times 10^{-4}$ and $3 \times 10^{-2}$ and wherein the molar ratio of boric oxide to alkaline earth metal oxide is in the approximate range of from 1:1 to 1.6:1 .

5. A lamp as in claim 4 wherein the stabilizer additive is a combination of calcium oxide and boric oxide.

6. A lamp as in claim 4 wherein $y$ is between about 0.1 – 0.5.

7. A lamp as in claim 4 which further includes a reflector undercoating upon which the phosphor coating is deposited.